United States Patent [19]

Kuzio

[11] 4,205,832
[45] Jun. 3, 1980

[54] HERRING STRIP CUTTER

[76] Inventor: Steven K. Kuzio, 1748 E. 64th Ave., Vancouver, British Columbia, Canada V5P 2M8

[21] Appl. No.: 17,586

[22] Filed: Mar. 5, 1979

[51] Int. Cl.² .............................................. A22C 25/00
[52] U.S. Cl. ....................................... 269/87.2; 17/70
[58] Field of Search ....................... 269/87.2, 295, 239, 269/270; 17/70

[56] References Cited

U.S. PATENT DOCUMENTS

| 2,741,061 | 4/1956 | Harrison | 17/70 |
| 2,795,814 | 6/1957 | Gaultney | 17/70 |
| 3,347,296 | 10/1967 | Rothman | 269/87.2 |
| 3,757,386 | 9/1973 | Murray | 17/70 |
| 4,056,026 | 11/1977 | Panaritis et al. | 269/87.2 |

Primary Examiner—Robert C. Watson
Attorney, Agent, or Firm—Smyth, Pavitt, Siegemund, Jones & Martella

[57] ABSTRACT

A device for holding bait fish to permit cutting a strip from the side of the fish. The device comprises a holding block having opposed sides and opposed faces. A first depression is formed in a first face of the holding block to hold a fish with a side of the fish protruding. There is a clamping plate having opposed sides and opposed faces. A second depression is formed in a first face of the clamping plate. The first and second depressions correspond in shape to hold opposed sides of a bait fish. There is a pivotal joint between the holding block and the clamping plate. The device is simple but effective and represents a substantial economy in bait preparation.

8 Claims, 6 Drawing Figures

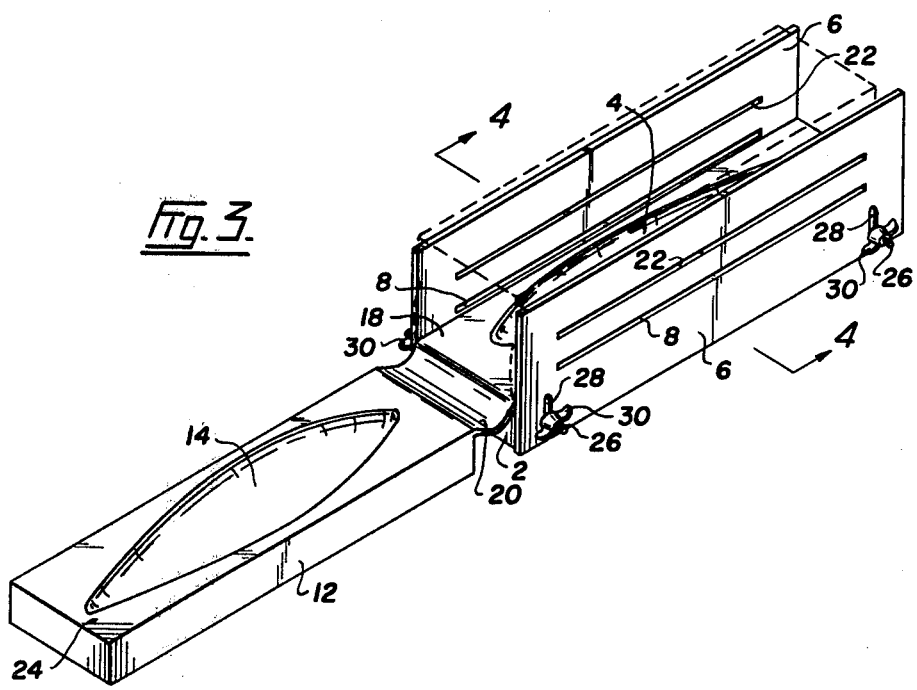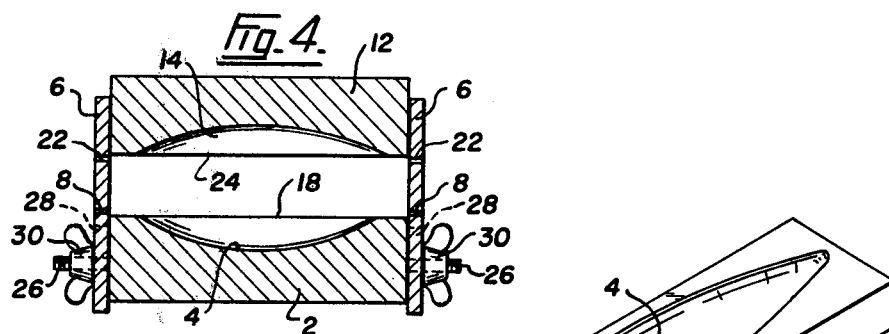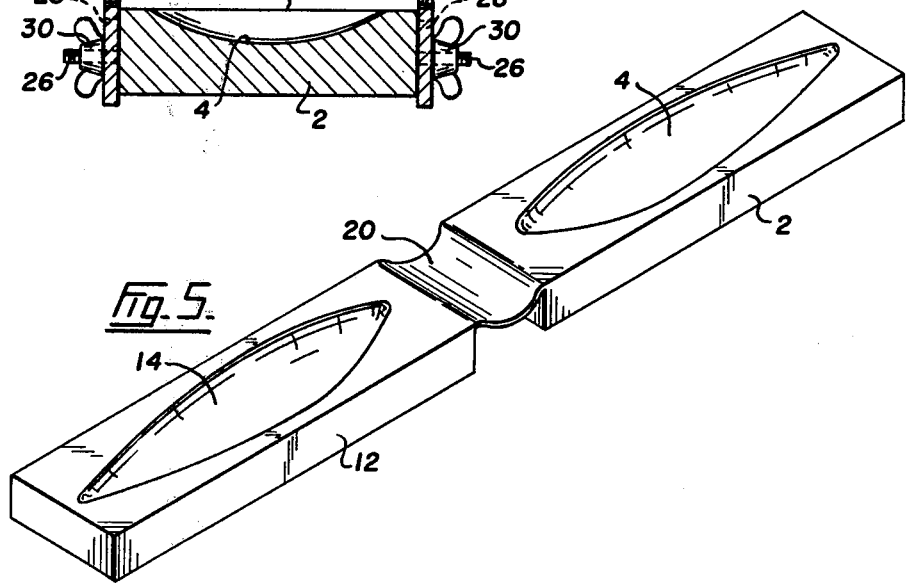

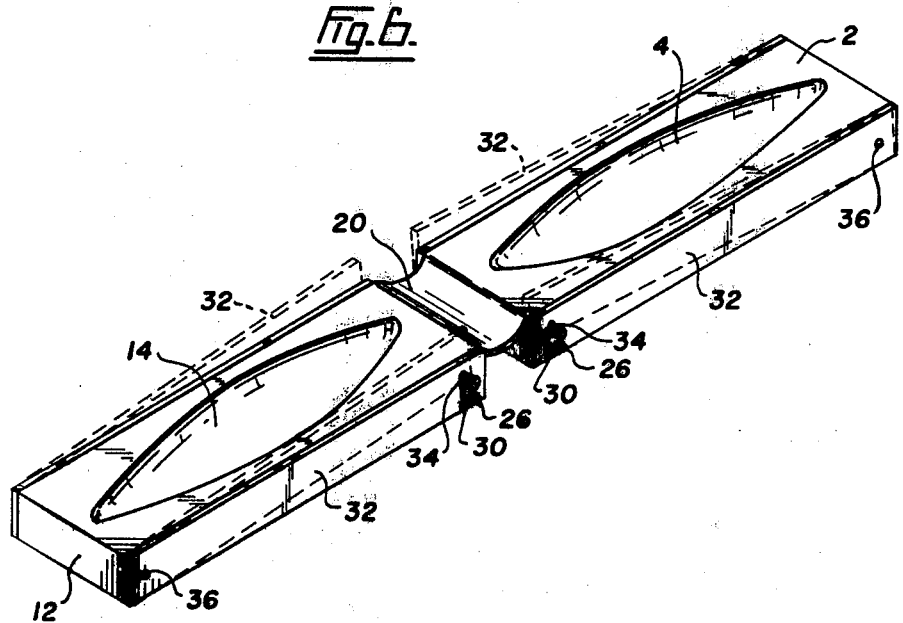

HERRING STRIP CUTTER

FIELD OF THE INVENTION

This invention relates to a device for holding fish, particularly bait fish, to permit cutting of strips from the fish.

DESCRIPTION OF PRIOR ART

Particularly in salmon fishing strips of bait are used. Typically the strips of bait are of fish, usually herring. Although cut herring can be purchased the machinery for cutting the herrings is complicated and, as a result, at current West Coast prices six frozen strips of herring cost about $1.50. Frozen herring cost also about $1.50 and those 6 herrings can be cut into 12 strips. Thus it is clearly advantageous economically to have a device that facilitates cutting of strips by the fisherman. However, there has not previously been any device that will permit the easy cutting of herring strips to allow the fisherman to produce his own bait. There is a need for a cheap, simple device that the fisherman can easily carry with him to permit the purchase of whole frozen herring rather than the already cut strips. If such a device is simple enough, and therefore cheap enough, the economy of purchasing the complete fish rather than the strips will quickly be established.

It is, of course, possible to cut the strips by hand but the results are not good. The strips are not uniform in thickness, particularly bearing in mind that the herring is slippery either because of its natural characteristics or because it is frozen.

SUMMARY OF THE INVENTION

The present invention therefore provides a device that is simple in structure, cheap to make and provides consistently uniform strips of bait fish for use in fishing, particularly salmon fishing. Accordingly, in a first aspect the present invention is a device for holding bait fish to permit cutting a strip from the side of the fish, the device comprising a holding block having opposed sides and opposed faces; a first depression formed in a first face of the holding block to hold a fish with a side of the fish protruding a clamping plate having opposed sides and opposed faces; a second depression formed in a first face of the clamping plate; the first and second depressions being correspondingly shaped to hold opposed sides of bait fish; a pivotal joint between the holding block and the clamping plate.

In a preferred aspect the device includes two walls, each extending from a side of the holding block to above the first face of the holding block and a longitudinal slot in each wall to guide a knife during cutting of a bait fish clamped in said depressions.

The device may have two slots in each wall to permit cutting both sides of the fish. One slot in each wall is adjacent the first side of the holding block, the second slot in each wall is adjacent the first face of the clamping plate when the block and clamping plate are held together to clamp a fish in the depressions.

In a further aspect the device comprises a holding block a depression in two faces of the block, each depression shaped to hold a fish with part of the fish protruding; a wall extending from each edge of each face of the block, each wall adjacent the side of a depression; a longitudinal slot in each wall at a predetermined distance above the depression; a second slot adjacent an end of each wall and substantially perpendicular to the longitudinal slot in said wall; a clamping plate; lugs extending from each side of the clamping plate at one end to engage in said second slots, whereby a fish can be clamped in a depression while a knife is moved down the longitudinal slots to cut the desired strip from that portion of the fish protruding from the depression.

BRIEF DESCRIPTION OF DRAWINGS

Embodiments of the invention are illutrated, merely by way of example, in the accompanying drawings in which:

FIG. 3 is a perspective view of a further embodiment of the invention;

FIG. 4 is a section along the line 4—4 of FIG. 3 but with the clamping plate in clamping position;

FIG. 5 illustrates a further aspect of the invention; and

FIG. 6 is a perspective view of a further embodiment.

DESCRIPTION OF THE PREFERRED EMBODIMENTS

Figure 1:
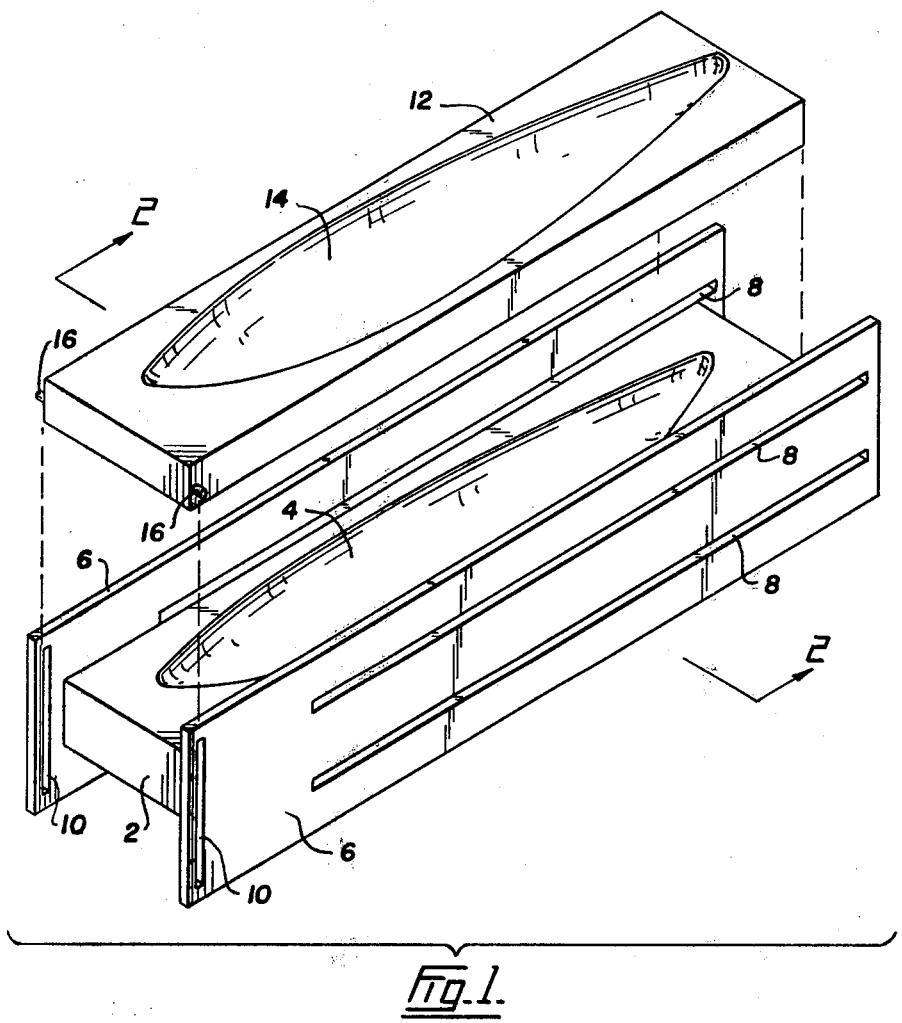
FIG. 1 is an exploded view of a device according to the present invention.
Figure 2:
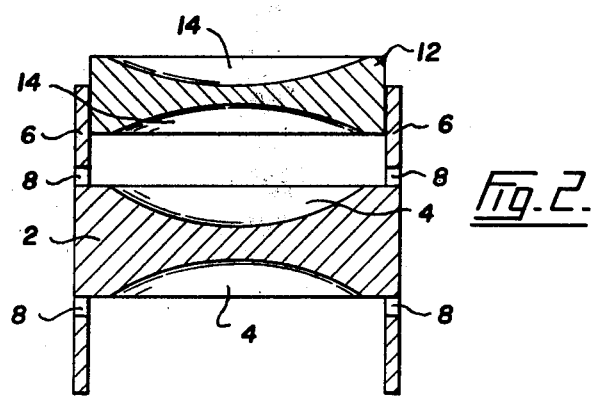
FIG. 2 is a section on the line 2—2 in FIG. 1.

Referring to the drawings, FIGS. 1 and 2 illustrate a device for holding bait fish to permit cutting a strip from the fish. The device comprises a holding block 2. There is a depression 4 in the block 2 shaped to hold a fish (not shown) with a side of the fish protruding. As illustrated particularly in FIG. 2 the holding block 2 has depressions 4 in both faces of the block. There are walls 6 at opposed faces of the block 2, each generally adjacent the side of a depression 4. A longitudinal slot 8 is formed in each wall and immediately above the depression. Slots 8 act as a guide for a knife blade to avoid injury to a user. There is a second slot 10 adjacent an end of each wall 6 and substantially perpendicular to the longitudinal slot 8 in each wall 6.

The device has a clamping plate 12. As illustrated particularly in FIG. 2, the clamping plate 12 has depressions 14 in each side to facilitate clamping of a fish in the depressions 4 in the block 2. The depressions 14 correspond to those depressions 4 in the block 2 so that a fish may be properly held. Thus one depression 4 is shaped to hold the right side of a fish and its corresponding depression 14 holds the left side of a fish. There are lugs 16 protruding from each side of the clamping plate 12 at one end, to engage in the second slots 10. The arrangement of the lugs 16 and of the second slots 10 is such that the clamping plate 12 can be used on either side of the block 2. That is it can be used to clamp a bait fish in one depression 4 in the block 2 and, when the strip has been cut, can be moved to the other side of the block 2 by lifting and pivoting the clamping plate 12 so that it extends longitudinally outwardly of the walls 6 and can thus be moved downwardly and then pivoted on the lugs 16 between the walls 6 on the other side of the block 2.

In use a herring is placed in a depression 4 in the block 2 and the clamping plate 12 is moved on the lugs 16 in the second slots 10 so that the fish is firmly held in a pair of corresponding depressions 4 and 14. A knife is moved down the longitudinal slots 8 so that the strip can be cut from the herring. When a strip has been cut from one side of the herring the fish can be removed and placed in the depression 4 on the other side of the block 2. Generally speaking the depressions in the block are shaped such that one can receive the left side of the fish with the right side protruding whereas the other can receive the right side of the fish with the left side protruding. The depressions in the clamping plate are, as indicated above correspondingly shaped.

The slots 8 are shown straight but they may be curved so that their centres are closer to the block 2 than their ends. Similarly the block 2 may be curved downwardly towards the centres of its opposed faces.

The cut strips are then ready for use as bait either in conventional strip holders after first trimming the strip to size or on hooks. The remainder of the fish can be rejected.

FIGS. 3 and 4 illustrate an embodiment of the invention in which there are two walls 6 each extending from a side of the holding block to above a first face 18 of the block. In all cases similar reference numerals are used for similar parts already shown in FIGS. 1 and 2. There is a longitudinal slot 8 in each wall to guide a knife during cutting of a bait fish clamped in depressions 4 and 14. In the embodiments of FIGS. 3 and 4 the pivoting arrangement between the holding block and the clamp plate is a simple hinge 20, for example of a plastic material. A typical, appropriate, plastic material is polypropylene.

There are additional slots 22 in each wall 6 to permit cutting both sides of a fish. Slots 8 in each wall are adjacent the first face 18 of the holding block but the second or upper slot 22 in each wall is adjacent a first face 24 of the clamping plate 12 when the block and the clamping plate are held together to clamp a fish in the depressions 4 and 14. This closed position is illustrated in FIG. 4 and in broken lines in FIG. 3. Furthermore the embodiment of FIGS. 3 and 4 features means to permit movement and clamping of the walls 6 so that the position of the slots 8 and 22 relative to the block 2 and the clamping plate 12 can be varied for differing thicknesses of fish. This means comprises studs 26 extending outwardly from each side of the block to extend through longitudinal slots 28 in the walls 6. A butterfly nut 30 is attached to each stud 26. The arrangement is such that if a fish of unusual thickness is encountered the butterfly nuts 30 can be loosened and the walls 6 moved upwardly so that a center line between the two slots 8 and 22 still coincides substantially with the center line of the fish. The butterfly nuts 30 are then tightened. The fish is positioned in the depressions and the slices are then cut using slots 8 and 12 as guides. Clearly the butterfly nuts 30 and studs 26 can be replaced by equivalent means. For example the block 2 can have threaded holes to receive bolts that clamp the walls 6 in position.

FIG. 5 illustrates a simple aspect of the invention in which the walls are not used. There is a polypropylene or the like hinge 20 as illustrated in FIG. 3 and, desirably, there are depressions 4 in each side of the block 2 and corresponding depressions 14 in each side of the clamping plate 12. The device of FIG. 5 is used by allowing the flat surfaces of the block and of the clamping plate, at the periphery of the depressions, to act as knife guides.

FIG. 6 illustrates a simple means of varying the distance of the cut above the faces of the block 2 and the clamping plate 12. Side walls 32 are positioned at the side of block 2 and clamping plate 12. Walls 32 are provided with slots 34 adjacent hinge 20 and with a pivotal connection 36 at their other ends. Connection 36 may, for example, by a rivet. In a manner analogous to that shown in FIG. 3 studs 26 project through slots 34 and nuts 30 engage on studs 26. The arrangement may also be varied to include, for example, threaded holes as discussed above for FIG. 3. By slackening nuts 30 the walls 32 can be varied between a lower position shown in solid lines in FIG. 6 to a higher position shown in broken lines. The pivoting joint 36 is possible because the tails of the fish do not vary greatly in thickness.

The basis of the depressions 4 and 14 are preferably roughened to facilitate girpping of the fish as it is cut. In all embodiments the longitudinal slots and faces of the holding block may be curved as described for FIGS. 1 and 2.

The device according to the present invention may be made of a plastic, for example nylon, or may be made of wood.

I claim:

1. A device for holding bait fish to permit cutting a strip from the side of the fish, the device comprising:
   a holding block having opposed sides and opposed faces;
   a first depression formed in a first face of the holding block to hold a fish with a side of the fish protruding;
   two walls, each extending from a side of the holding block to above the first face of the holding block;
   a clamping plate having opposed sides and opposed faces;
   longitudinal slots in each wall to guide a knife during cutting and to permit cutting both sides of the fish, one slot in each wall adjacent the first side of the holding block, the second slot in each wall adjacent the first face of the clamping plate when the block and clamping plate are held together to clamp a fish in the depression;
   a second depression formed in a first face of the clamping plate;
   the first and second depressions being correspondingly shaped to hold opposed sides of a bait fish;
   a pivotal joint between the holding block and the clamping plate; and
   means to permit movement and clamping of the walls so that the position of the slots relative to the block and the clamping plate can be varied for different thicknesses of fish.

2. A device as claimed in claim 1 including a third depression in the second face of the block and a corresponding fourth depression in the second face of the clamping plate.

3. A device as claimed in claim 2, including walls extending from each side of the block above each face of the block; a longitudinal slot formed in each wall as a knife guide, one pair of slots adjacent the first face of the holding block, a second pair of slots adjacent the second face of the holding block.

4. A device for holding bait fish to permit cutting a strip from the fish, the device comprising;
   a holding block;
   a depression in two faces of the block, each depression shaped to hold a fish with part of the fish protruding;
   a wall extending from each edge of each face of the block, each wall adjacent the side of a depression;
   a longitudinal slot in each wall at a predetermined distance above the depression;
   a second slot adjacent an end of each wall and substantially perpendicular to the longitudinal slot in said wall;
   a clamping plate;

lugs extending from each side of the clamping plate at one end to engage in said second slots, whereby a fish can be clamped in a depression while a knife is moved down the longitudinal slots to cut the desired strip from that portion of the fish protruding from the depression.

5. A device as claimed in claim 4 in which the clamping plate is formed with corresponding depressions to facilitate clamping.

6. A device as claimed in claim 4 in which the depressions are roughened to facilitate gripping of a fish being cut.

7. A device as claimed in claim 5 in which the depressions are roughened to facilitate gripping of a fish being cut.

8. A device as claimed in claim 7 including a wall movably attached to each side of the holding block and to each side of the clamping plate;
  means to enable location of each wall in a predetermined position.

* * * * *